US006419395B1

(12) United States Patent
Taylor

(10) Patent No.: US 6,419,395 B1
(45) Date of Patent: Jul. 16, 2002

(54) SLIDE BEARING ASSEMBLY

(75) Inventor: John P. Taylor, Lexington, KY (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 09/740,476

(22) Filed: Dec. 19, 2000

(51) Int. Cl.[7] .............................................. F16C 33/00
(52) U.S. Cl. ................ 384/42; 384/7; 403/61
(58) Field of Search ................ 384/50, 7, 42, 384/41; 403/52, 59, 61, 71; 74/99 R, 101–106, 48, 53; 16/357, 358, 360, 273

(56) References Cited

U.S. PATENT DOCUMENTS

| | | | | |
|---|---|---|---|---|
| 3,696,684 A | * | 10/1972 | Estlick | 74/104 |
| 3,797,324 A | * | 3/1974 | Sheesley et al. | 74/99 R |
| 4,259,811 A | * | 4/1981 | Davis | 49/356 |
| 4,452,545 A | * | 6/1984 | Colautti | 403/61 |
| 5,050,270 A | * | 9/1991 | Burgei et al. | 16/298 |
| 5,984,527 A | * | 11/1999 | Kober | 384/192 |

* cited by examiner

Primary Examiner—Paul N. Dickson
Assistant Examiner—Mariano Sy
(74) Attorney, Agent, or Firm—David R. Stacey; Larry T. Shrout; Larry I. Golden

(57) ABSTRACT

A bearing assembly for a sliding mechanism in which the potential for erosion of bearing surfaces is significantly reduced. The bearing assembly includes a cylindrical bearing that engages the bearing surface of a slide as it slidably moves with respect to the bearing assembly. The bearing assembly is configured such that rotation of the cylindrical bearing is in no way restricted and at no time is an edge or end of the cylindrical bearing engaged with the bearing surface of the slide.

12 Claims, 3 Drawing Sheets

SLIDE BEARING ASSEMBLY

FIELD OF THE INVENTION

The present invention relates to the field of sliding mechanisms, and particularly to support bearings for the sliding mechanism.

Figure 1:
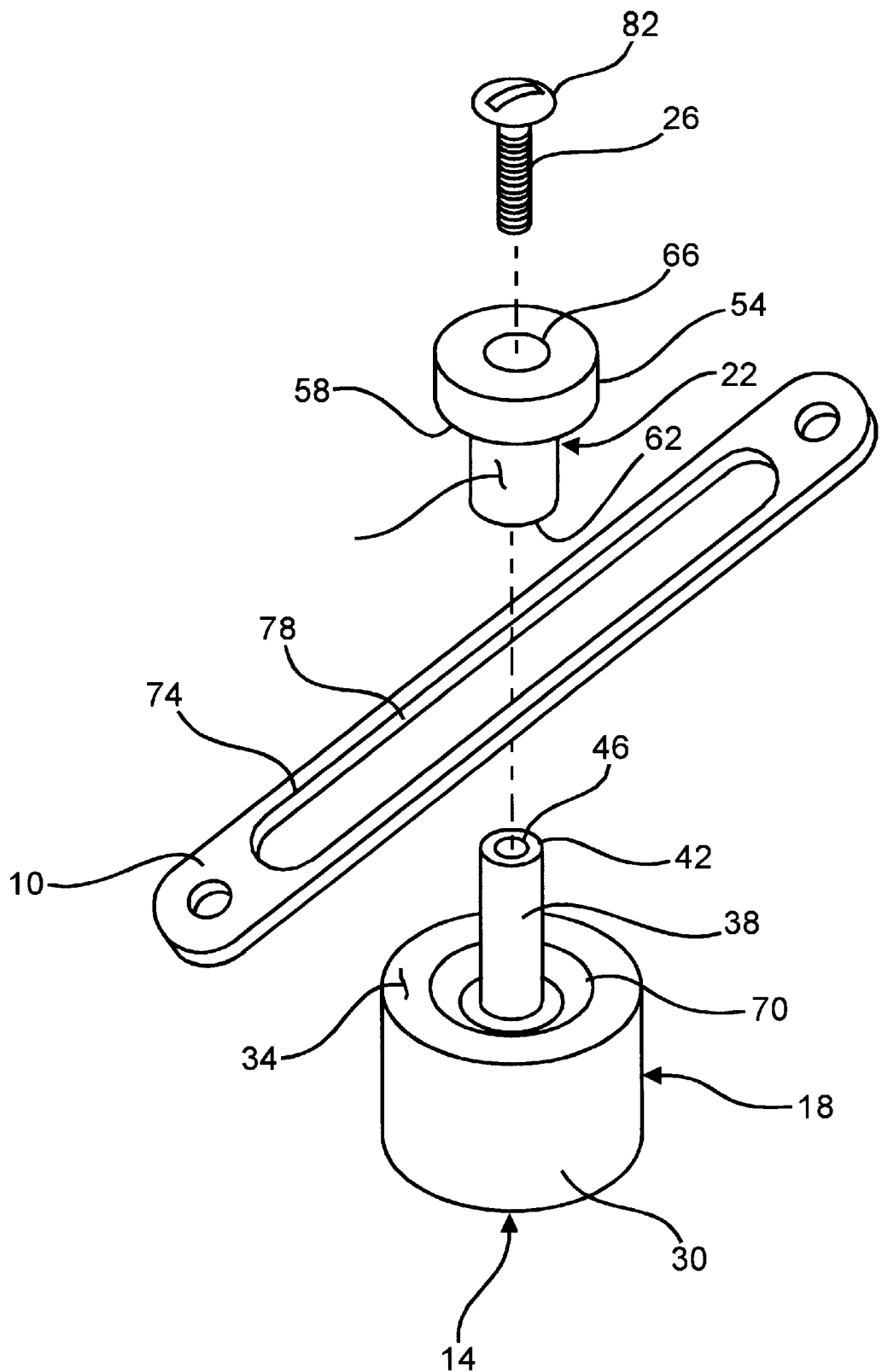
FIG. 1 is an isometric view of a slide and slide support bearing assembly constructed in accordance with the present invention.

Before one embodiment of the invention is explained in detail, it is to be understood that the invention is not limited in its application to the details of construction described herein or as illustrated in the drawings. The invention is capable of other embodiments and of being practiced or being carried out in various other ways. Further, it is to be understood that the phraseology and terminology used herein is for the purpose of description and should not be regarded as limiting.

DETAILED DESCRIPTION OF THE DRAWINGS

Figure 2:
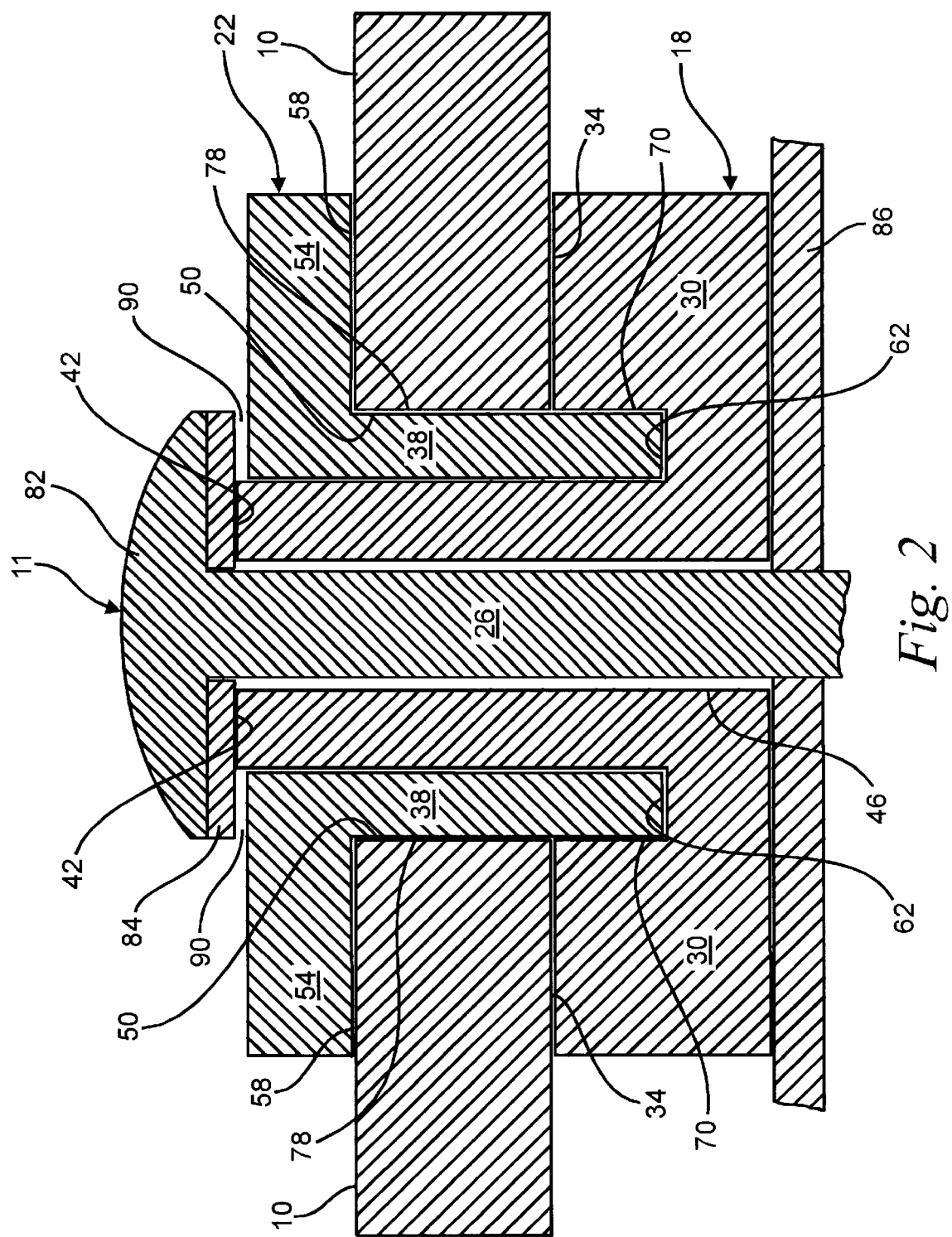
FIG. 2 is a cross-sectional view of a slide and support bearing assembly constructed in accordance with the present invention with the cylindrical bearing in a first position.

FIG. 1 illustrates, in exploded view, a simple mechanical slide 10 for slating movement and/or force from one point to another, and a slide bearing assembly 14, constructed in accordance with the present invention. The slide 10 translates movement and/or force by slidably moving with respect to the bearing assembly 14, which provides support and guidance to the slide 10. The bearing assembly 14 includes a bearing support 18, a cylindrical bearing 22 and a fastener 26. The bearing support 18 defines a base 30 having at least one generally flat surface 34, an axle 38 that extends outwardly from and generally perpendicular to the flat surface 34, a distal end 42 and an aperture 46 for receiving the fastener 26. The cylindrical bearing 22 has a cylindrical bearing surface 50, a cap 54 with at least one generally flat surface 58, a distal end 62 and a central passage 66 dimensioned to snugly but rotatively receive the axle 38. The bearing support 18 further defines a bearing relief 70 in the flat surface 34 at its intersection with the axle 38. The bearing relief 70 is generally coaxial with the axle 38 and is dimensioned to snugly, but rotatively, receive the distal end 62 of the cylindrical bearing 22. The slide 10, shown in its simplest form, defines a longitudinal slot 74 that is dimensioned to snugly, but slidably, receive the cylindrical bearing 22. The perimeter of the slot 74 defines a bearing surface 78 that engages the cylindrical bearing 22 as the slide 10 slidably moves with respect to the bearing assembly 14, Referring now to FIG. 2, in a cross-sectional view of the slide 10 and slide bearing assembly 14, it can be seen that the head 82 of fastener 26 presses tightly against the distal end 42 of the bearing support, thereby securing the slide bearing assembly 14 to a portion 86 of an enclosure (not shown in its entirety). The head 82 of the fastener 26 or a washer 84 must be large enough to also captivate the cylindrical bearing 22 and thereby the slide 10 between the flat surfaces 34 and 58. A clearance gap 90, shown between the head 82 of the fastener 26 and the cylindrical bearing cap 54, prohibits clamping of the cylindrical bearing 22 between the fastener 26 and bearing support 18. The clearance gap 90 allows the cylindrical bearing 22 to rotate freely about the axle 38 as the slide 10 moves with respect to the slide bearing assembly 14. With the clearance gap 90 between the fastener head 82 and the bearing cap 54, distal end 62 of the cylindrical beating 22 is positioned near the bottom of the bearing relief 70 and well below the flat surface 34. In this position, the distal end 62 of the cylindrical bearing 22 can not engage the bearing surface 78 of the slide 10 and thereby erode the bearing surface 78 causing an operational failure of the slide 10 and slide bearing assembly 14.

Figure 3:
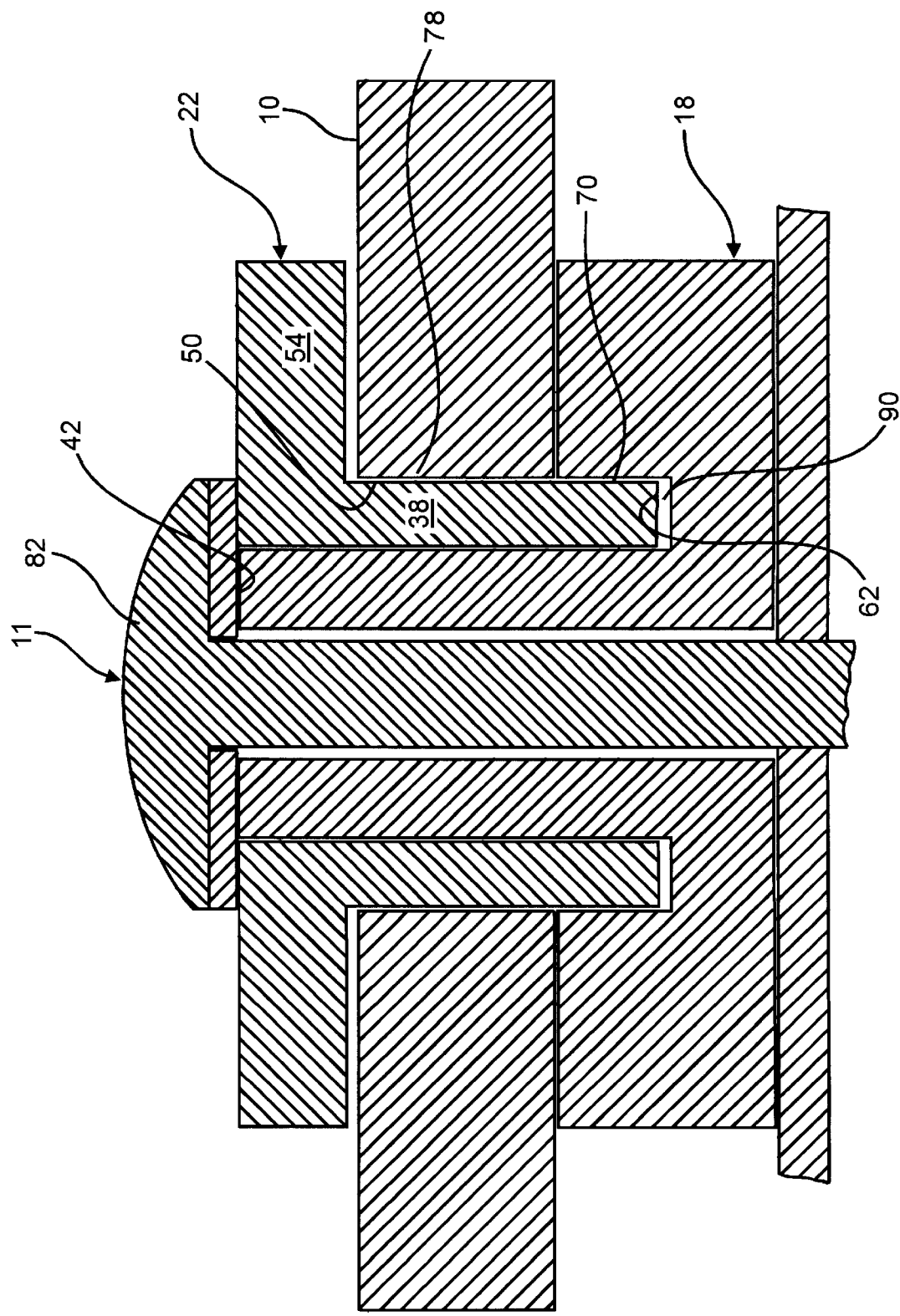
FIG. 3 is a cross-sectional view of a slide and support bearing assembly constructed in accordance with the present invention with the cylindrical bearing in a second position.

Referring now to FIG. 3, a second condition is illustrated in which the cylindrical bearing 22 has slidably moved up the axle 38 such that the cap 54 is in contact or close proximity with the fastener head 82. In this position, the clearance gap 90 is now between the distal end 62 of the cylindrical bearing 22 and the bottom of the bearing relief 70; however, the distal end 62 is still sufficiently below the flat surface 34 of the base 30 to prevent engagement with the bearing surface 78 of the slide 10. The relationship of the overall length of the cylindrical bearing 22 with respect to the full length of the axle 38 is such that at no time can the distal end 62 of the cylindrical bearing 22 extend above the flat surface 34 of the base 30. Therefore, the bearing surface 78 of the slide 10 is continuously in full contact with the cylindrical bearing surface 50 of the cylindrical bearing 22, thereby eliminating or significantly reducing any abnormal wear to the bearing surfaces 50 and 78.

I claim:

1. A support bearing assembly for a translation slide comprising;

a slide for translating motion and force;

a bearing support having a base including at least one generally flat surface and an axle extending generally perpendicularly from said flat surface; and, a cylindrical bearing having a cap including at least one generally flat surface, a cylindrical bearing surface, a distal end and a central passage dimensioned to slidably receive said axle, said bearing support and said cylindrical bearing being configured for captivating said slide between said at least one generally flat surface of said base and said at least one generally flat surface of said cap.

2. The support bearing assembly of claim 1, wherein said bearing support further defines a bearing relief in said generally flat surface, said bearing relief being generally coaxial with said axle.

3. The support bearing assembly of claim 2, wherein said distal end of said cylindrical bearing is received in said bearing relief.

4. The support bearing assembly of claim 3, wherein said slide defines a longitudinal slot dimensioned to slidably receive said distal end of said cylindrical bearing.

5. The support bearing assembly of claim 4, wherein a perimeter of said slot defines a bearing surface of said slide.

6. The support bearing assembly of claim 5, wherein said cylindrical bearing surface is in continuous engagement with said bearing surface of said slide such that erosion of either of said bearing surfaces is significantly reduced.

7. A support bearing assembly for a translation slide comprising:

a slide for translating motion and force;

a bearing support having a base including at least one generally flat surface and an axle extending generally perpendicularly from said flat surface; and, a cylindrical bearing having a cap including at least one generally flat surface, a cylindrical bearing surface, a distal end and a central passage dimensioned to slidably receive said axle, said bearing support and said cylindrical bearing being configured for captivating said slide between said at least one generally flat surface of said base and said at least one generally flat surface of said cap, said cylindrical bearing surface being in continuous engagement with a bearing surface of said slide such that erosion of either of said bearing surfaces is significantly reduced.

8. The support bearing assembly of claim 7, wherein said slide defines a longitudinal slot dimensioned to slidably receive said distal end of said cylindrical bearing.

9. The support bearing assembly of claim 8, wherein a perimeter of said slot defines said bearing surface of said slide.

10. The support bearing assembly of claim 9, wherein said bearing support further defines a bearing relief in said generally flat surface, said bearing relief being generally coaxial with said axle.

11. The support bearing assembly of claim 10, wherein said distal end of said cylindrical bearing is received in said bearing relief.

12. A support bearing assembly for a translation slide comprising:

a slide for translating motion and force;

a bearing support having a base including at least one generally flat surface, an axle extending generally perpendicularly from said at least one generally flat surface and a bearing relief defined in said at least one generally flat surface and being generally coaxial with said axle; and, a cylindrical bearing having a cap including at least one generally flat surface, a cylindrical bearing surface having a distal end and a central passage dimensioned to slidably receive said axle, said bearing support and said cylindrical bearing being configured for captivating said slide between said at least one generally flat surface of said base and said at least one generally flat surface of said cap, said distal end of said cylindrical bearing being received within said bearing relief such as to prohibit said distal end from being engaged by a bearing surface of said slide, thereby significantly reducing erosion of either of said bearing surfaces.

* * * * *